Figure 1:
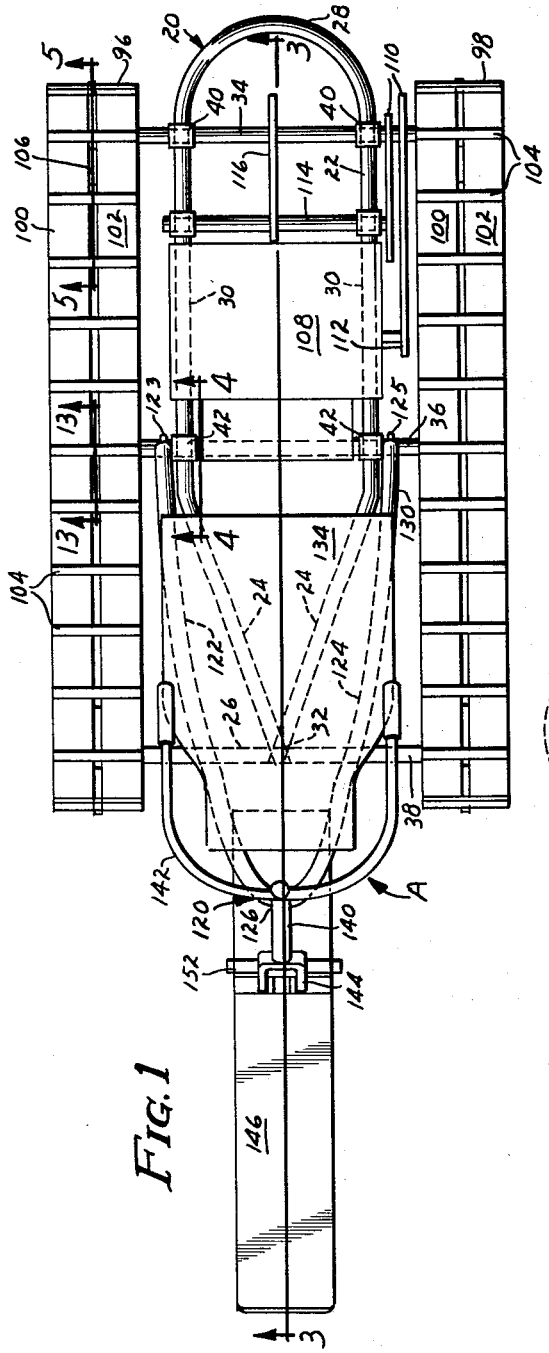

Sept. 15, 1964 A. J. JARVI ETAL 3,148,743
SELF-PROPELLED SNOW VEHICLE
Filed Feb. 23, 1962 3 Sheets-Sheet 1

INVENTORS
ARTHUR J. JARVI
NESTOR W. JARVI
BY William F. Woode
ATTORNEY

Sept. 15, 1964     A. J. JARVI ETAL     3,148,743

SELF-PROPELLED SNOW VEHICLE

Filed Feb. 23, 1962     3 Sheets-Sheet 2

INVENTORS
ARTHUR J. JARVI
NESTOR W. JARVI
BY William F. Woods
ATTORNEY

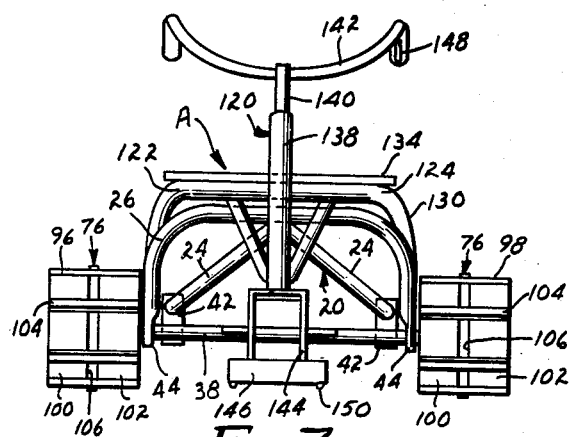
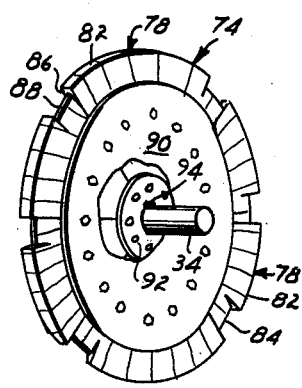
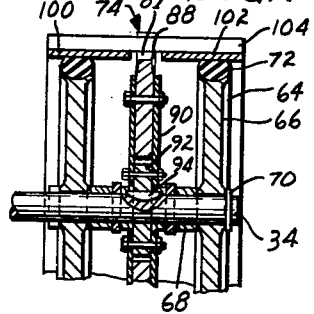
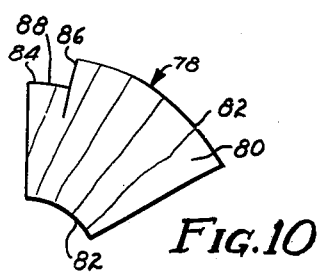
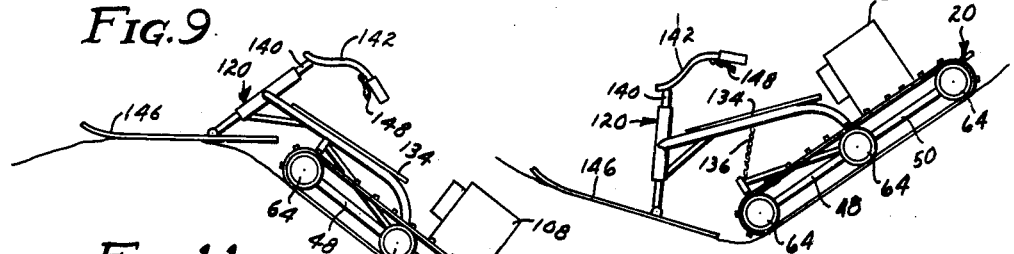
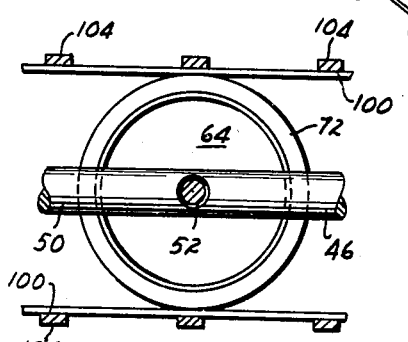

United States Patent Office 3,148,743
Patented Sept. 15, 1964

3,148,743
SELF-PROPELLED SNOW VEHICLE
Arthur J. Jarvi and Nestor W. Jarvi, both of
336 E. Midland Ave., Ironwood, Mich.
Filed Feb. 23, 1962, Ser. No. 174,952
2 Claims. (Cl. 180—5)

This invention relates to a new and improved snow vehicle; more particularly, it concerns a unique self-propelled snow vehicle adapted to travel over varying terrain and snow conditions with ease and facility.

Snow covered terrain can provide severe problems for mechanical transport. Soft snow requires a vehicle with first-class traction and a minimum of frictional drag; hard-packed snow, especially in the form of fluted ridges carved by the wind from a snow surface, requires a good suspension system in addition to adequate means for propulsion of the vehicle. Another problem encountered in the design of snow vehicles centers around the method used for steering the vehicle. With vehicles of the center track type steering is accomplished by a pair of skiis mounted in a rigid manner forwardly of the track. Such a unit works quite well on hard-packed surfaces but tends to bog down and dig itself in when used on soft snow surfaces several feet in depth. Other vehicles employ conventional full-track systems wherein steering is obtained by braking on the inboard track through a cletrack arrangement. In these types of vehicles the traction ability is greatly reduced in soft snow because of the tendency of the unit to dig itself in during a turn. Steering by braking through a controlled differential in the two track system is also used. All of these systems are costly to build, offer rather considerable maintenance problems and do not function with optimum results. Yet another consideration in the design of a suitable snow vehicle is the manner in which the load is carried in relation to the traction system and the steering system. In general, the prior art vehicles provide a rigid connection between the traction elements and the steering unit resulting in the entire load being distributed upon the traction elements in deep snow or slush. This arrangement aggravates the traction problem inasmuch as conventional traction systems are quickly bogged down once they start to sink in soft snow; it can be seen that the addition of the steering and payload weight upon the traction system at such a time accelerates the eventual stalling of the vehicle.

Accordingly, it is an important object of this invention to provide a machine that will overcome the above disadvantages and limitations.

Another primary object of this invention is to provide an improved self-propelled snow vehicle.

Another object of this invention is to provide a snow vehicle adapted to travel easily over varying snow conditions without getting bogged down or stuck in soft snow or experiencing difficulty in traversing terrain characterized by concave and convex surfaces of varying inclination.

A further object of this invention is to provide a snow vehicle having superior steering characteristics and traction ability by virtue of the manner in which the load is distributed between the traction system and the steering unit.

Yet another object of this invention is to provide a vehicle of the type described that can be manufactured at a relatively low cost, is attractive in appearance and extremely rugged in operation.

Another object of this invention is to provide in a snow vehicle novel means for providing a floating connection between the payload carrying structure and the traction system.

A further object of this invention is to provide novel traction means for a snow vehicle.

Still another object of this invention is to provide a new and improved light-weight snow vehicle adapted to operate under severe conditions of snow and terrain.

Another object of this invention is to provide a new and improved snow vehicle characterized by a traction system having a minimum of parts and affording improved operational qualities.

Another object of this invention is to provide a snow vehicle having a traction frame pivotally connected to a load carrying frame whereby to secure improved traction and running performance under all conditions of snow and terrain.

These and other objects and advantages of the invention will be more fully set forth in the following detailed description and accompanying drawings wherein an embodiment of the invention is shown by way of illustration and not by way of limitation.

Figure 2:
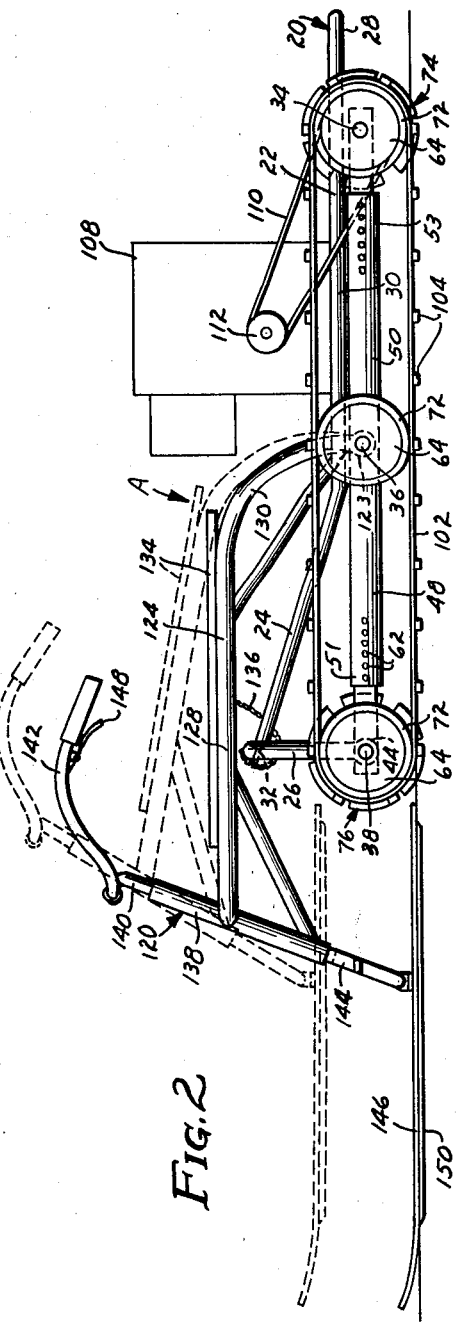
Figure 4:
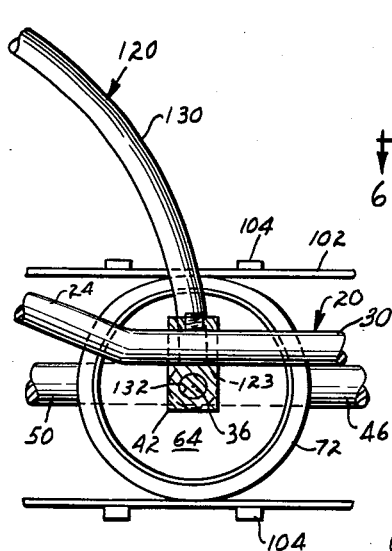
Figure 5:
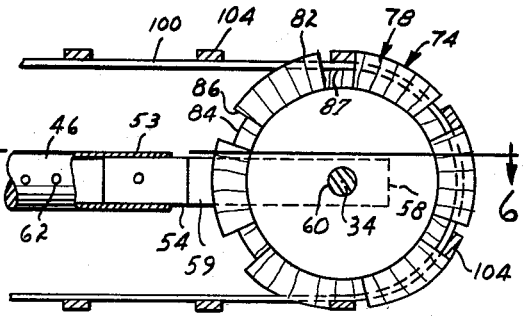
Figure 6:
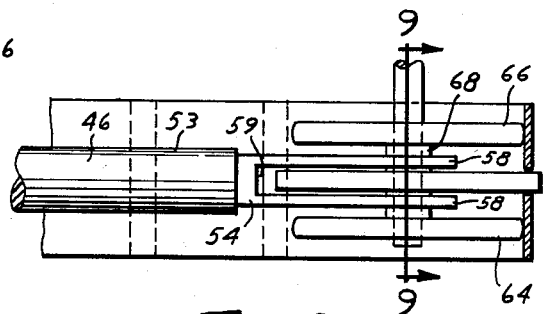
Figure 3:
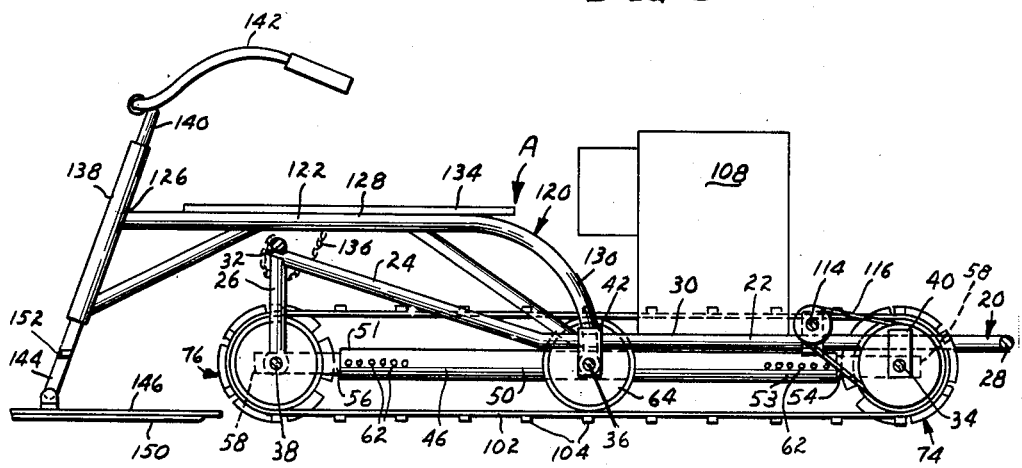

In the drawings:
FIGURE 1 is a top plan view of the invention;
FIGURE 2 is a side elevational view of the invention;
FIGURE 3 is a fragmentary central longitudinal view, partially in section, taken along the line 3—3 of FIGURE 1;
FIGURE 4 is an enlarged fragmentary view taken along the line 4—4 of FIGURE 1;
FIGURE 5 is an enlarged fragmentary view, partially in section, taken along the line 5—5 of FIGURE 1;
FIGURE 6 is an enlarged fragmentary view taken along the line 6—6 of FIGURE 5;
FIGURE 7 is a front elevational view of the invention;
FIGURE 8 is an enlarged perspective view, with parts broken away, of one of the drive cog wheels forming part of the invention;
FIGURE 9 is a sectional view taken along the line 9—9 of FIGURE 6;
FIGURE 10 is an enlarged plan view of one of the cog elements making up the cog wheel shown in FIGURE 8;
FIGURE 11 is a pictorial sketch of the invention showing the manner in which the vehicle accommodates itself to convex irregularities in the surface over which it travels;
FIGURE 12 is a view similar to FIGURE 11 showing the manner in which the vehicle accommodates itself to concave irregularities in the surface over which it travels; and
FIGURE 13 is an enlarged fragmentary view taken on the line 13—13 of FIGURE 1.

Referring now to the drawings, the invention, designated in its entirety by the reference character A, includes a centrally open generally longitudinal traction frame 20 having a rear horizontal section 22 and a forward upwardly inclined section 24 secured at its upper end to a downwardly open generally vertical U-shaped support section 26. Horizontal section 22 and inclined section 24 of traction frame 20 may be fabricated of a single piece of suitable tubing to produce the shape illustrated in FIGURES 1–3. This arrangement results in a centrally open lightweight frame having a curved rear section 28 which may be used to lift or carry the vehicle, and laterally spaced longitudinal support members 30 that terminate at their forward upper ends in an apex 32. Vertical support section 26 is also fabricated of lightweight tubing and secured by conventional means to support members 30 at apex 32.

The traction system of the vehicle further includes a set of three axles, 34, 36 and 38 mounted laterally of frame 20 at the rear, middle and front thereof, respectively, and extending on each side thereof. Mounting of rear axle 34, and middle axle 36 is accomplished by suitably bored mounting brackets 40 and 42, secured to support members 30 of frame 20. Forward axle 38 is suitably received in appropriate apertures 44 in support section 26. Rear axle 34 is rotatably carried by mounting brackets 40 while middle axle 36 and forward axle 38 are carried by support members 30 and section 26, respectively, without particular regard to their rotational movement. As shown in the several views, axles 34, 36 and 38 are in vertical alignment with rear axle 34 and forward axle 38 being spaced equidistantly from middle axle 36.

Longitudinal support of axles 34, 36 and 38 is provided in the form of laterally spaced elongated tubular strut members 46, 48 carried outside of and parallel to frame 20. Struts 46 and 48 are secured at their rear ends to axle 34, at their middle portions to axle 36 and at their forward ends to axle 38. Strut members 46, 48 are each characterized by an elongated central portion 50 having a central aperture 52 through which middle axle 36 passes and clevis equipped forward and rear ends 51 and 53, respectively. As shown in FIGURES 3, 5 and 6, clevis member 54 is secured to the rear end of strut member 46, while clevis member 56 is secured to the forward end thereof. Strut member 48 also carries clevis members 54, 56 in a similar manner. Clevis members 54, 56 each consists of a pair of spaced longitudinally extending arms 58 defining therebetween a longitudinal opening 59 coincident with the axis of struts 46, 48. A bore 60 in clevis members 54, 56 permit the passage therethrough of rear axle 34 and forward axle 38, respectively. Means for adjusting the length of strut members 46, 48 is provided by virtue of longitudinally spaced mounting holes 62 drilled in the ends of central portion 50 and in the shoulder of clevis members 56 to allow for the limited extension or retraction of clevis members 56 with respect to strut members 46 and 48.

The traction system further includes a series of track guide and support wheels 64 arranged in pairs 66 on each end of axles 34, 36 and 38. Each pair 66 of wheels 64 is mounted on their respective axles so as to be freely rotatable thereabout. As shown in FIGURES 6, and 9, suitable collars 68 and end retainers 70 prevent the undue axial displacement or wobbling of wheels 64 upon their respective axles. Wheels 64 are of the conventional type found in such applications as the "Go-Kart," wagons, and the like. They are preferably equipped with solid rubber tires 72 which present a generally flat peripheral surface of greater width than the thickness of the wheel body. The wheels 64 that are mounted on rear axle 34 and forward axle 38 are positioned on the outside of arms 58 of clevis members 54, 56, respectively, while the wheels 64 that are carried by middle axle 36 are mounted on each side of central portion 50 of strut members 46 and 48.

Carried within the arms 58 of rear clevis members 54 and rotatable with rear axle 34 are drive cog wheel members 74. The forward ends of strut members 46, 48 are equipped with guide cog wheel members 76 which are mounted between arms 58 of forward clevis members 56. Cog wheel members 74 and 76 are generally identical with the exception that drive cog wheel 74 is keyed to rear axle 34 while guide cog wheel 76 is freely rotatable with respect to forward axle 38. FIGURES 8, 9 and 10 set forth the details of cog wheel 74 and its mounting relationship with axle 34. Cog wheel 74 includes a plurality of radially arranged generally sector shaped cog elements 78 (shown in FIGURE 10), each of which is characterized by a sector-like body 80 having generally circular inner and outer profiles 82. A radially reduced shoulder 84 of relatively narrow circumferential length defines with the outer circumference of body 80 a contact face 86 radially extending inwardly therefrom. The circumferential face 88 of shoulder 84 is preferably of a reduced width. As illustrated in FIGURE 10, cog elements 78 may be fabricated of hardwood sawed so that the grain runs generally parallel to contact face 86.

Means for securing cog elements 78 to shaft 34 includes a pair of annular supporting plates 90 bolted or otherwise fastened to the outer surfaces of cog elements 78 in the manner shown in FIGURES 8 and 9. The result is a cog wheel having radial notches along its perimeter. Also carried between plates 90 is an annular bearing member 92 which is keyed, as at 94, to shaft 34. Thus cog wheel 74 is rotatable with shaft 34 within opening 59 of clevis member 54. In a similar manner guide cog wheel members 76 are mounted on the forward ends of struts 46 and 48, although they do not rotate with forward axle 38 but are carried thereupon in a freely rotatable manner.

The traction system further includes identical endless flexible track members 96, 98 mounted on each side of frame 20 and trained over wheels 64. Each track member 96, 98 is made up of a pair of laterally spaced endless belts 100, 102 connected by means of longitudinally spaced crossbars 104. It can be seen that the longitudinal opening 106 between belts 100, 102 is in register with the plane of cog wheels 74, 76 thereby permitting contact faces 86 thereof to extend through the plane of belts 100, 102 to engage crossbars 104 and impart driving motion to the traction system. Clearance, as at 87, is provided between shoulders 84 of cog wheels 74, 76 and crossbars 104. The belts 100, 102 are carried entirely by support wheels 64 with cog wheels 74, 76 serving to drive and guide the belts free of any actual contact therewith. Crossbars 104 are preferably made of a suitable grade of hardwood. It has been found that by employing wood material in both cog elements 78 and crossbars 104 wear is reduced to a minimum without sacrificing strength or other desired physical properties necessary for the adequate propulsion and traction characteristics of the vehicle.

Means for powering the traction system includes a conventional motor (preferably of the air-cooled internal combustion type) 108 mounted upon section 22 of frame 20 between the middle axle 36 and the rear axle 34. Power is transmitted to the rear axle 34 by means of a suitably ratioed driving arrangement consisting of drive assembly 110 connected directly to clutch 112 of motor 108 and engageable through an appropriate countershaft 114 and drive assembly 116 to the rear axle 34.

The load carrying section of the vehicle includes a centrally open generally longitudinal load carrying frame 120 characterized by a pair of spaced elongated tubular support members 122, 124 that curve together in a horizontal plane at their forward ends, as at 126. The forward section 128 of frame 120 is generally horizontal and rests upon support section 26 and support members 30 of traction frame 20 at apex 32 thereof. The rearward section 130 of frame 120 is curved downwardly and rearwardly so that the lower ends 123, 125 of support members 122, 124 are in surrounding engagement with and pivotally supported upon middle axle 36. This is accomplished by suitable bores 132 in support members 122, 124, as disclosed in FIGURE 4 of the drawings. As seen in FIGURE 1, support members 122 and 124 are mounted upon axle 36 between mounting brackets 42 and in spaced relation to track members 96 and 98 whereby to allow for the pivotal movement of frame 120 in a vertical plane about the axis defined by axle 36. A load carrying platform 134 is secured to the top of section 128 of frame 120. Means for limiting the upward rotation of frame 120 about its pivotal axis is accomplished by a flexible chain member 136 secured to the bottom of platform 134 and to apex 32 of frame 20.

Carried at the forward end of frame 120 is an inclined trunnion 138 through which extends a tubular shaft 140 adapted to rotate about its own axis therewithin. Suitable handle bars 142 are mounted upon the upper end of shaft 140 and a lower fork assembly 144 extends therebelow. The lower end of fork assembly 144 is pivotally mounted for limited vertical movement to a ground engaging runner 146. Suitable remote control means 148 are provided on handle bars 142 to operate the vehicle. Runner 146 is equipped with laterally spaced elongated blades 150 on the bottom surface thereof to facilitate the steering of the vehicle over hard packed snow or ice. Suitable foot bars 152 are provided adjacent runner 146.

The pivotal connection between load carrying frame 120 and traction frame 20 allows for the easy running of the vehicle over all types of snow covered terrain. That is, the rockable movement of load carrying frame 120 with respect to traction frame 20 makes it possible for the vehicle to traverse either convex or concave surfaces without getting hung up or bogged down even in deep snow. FIGURE 11 pictorially shows the vehicle going over a convex surface with frame 120 being pivoted angularly in a downward and forwardly direction about middle axle 36 with respect to frame 20. Any chance of running through the convexity instead of over it due to the tendency of the traction unit to follow and dig in behind the steering unit is obviated by the flexible pivotal or floating connection described herein. Similarly, when traversing a concave slope, as shown in FIGURE 12, the traction unit is independently supported on its immediate surface without regard to the upward curvature of the slope encountered by the steering unit. Here again, the pivotal or floating connection between frame 120 and frame 20 provides for maximum flexibility in the vehicle's ability to travel over surfaces of all kinds. Obviously, combined convex and concave slopes can be traversed with equal ease.

The dividing of the load carried by the vehicle into two independent and distinct forces (the payload being supported in large part by the runner equipped load carrying forward frame 120, and the traction system including the motor and drive elements being supported by the rear traction frame 20), thus results in unique operational advantages heretofore not known.

While a preferred embodiment of the invention is shown and described herein, no limitation in that regard is intended. It will be obvious to those skilled in the art that many modifications in the invention can be made without departing from its spirit and scope. We, therefore, intend to be limited solely by the scope of the appended claims.

We claim:

1. In a self-propelled snow vehicle including a traction frame, forwardly extending load carrying and ground engaging steering means pivotally secured to said frame, motor drive means mounted on said frame, longitudinally split endless belt means rotatably mounted on each side of said frame, a plurality of cross bars overlying each of said belt means to form therewith traction means for said vehicle, the combination of:

a drive cog wheel operatively connected to said motor drive means and rotatably mounted on each side of said frame; and a guide cog wheel rotatably mounted on each side of said frame in longitudinally spaced relation to said drive cog wheel;

said cog wheels each being engageable with said cross bars and each including a plurality of circumferentially arranged sector shaped elements;

each of said sector shaped elements having a radial cross bar contact face and an arcuate shoulder extending therefrom in radially inwardly spaced relation to said cross bars;

said arcuate shoulders of said sector shaped elements being of lesser width than the said contact faces.

2. In a self-propelled snow vehicle including a traction frame, forwardly extending load carrying and ground engaging steering means pivotally secured to said frame, motor drive means mounted on said frame, longitudinally split endless belt means rotatably mounted on each side of said frame, a plurality of cross bars overlying each of said belt means to form therewith traction means for said vehicle, the combination of:

a drive cog wheel operatively connected to said motor drive means and rotatably mounted on each side of said frame and a guide cog wheel rotatably mounted on each side of said frame in longitudinally spaced relation to said drive cog wheel;

said cog wheels each being engageable with said cross bars and each including a plurality of circumferentially arranged sector shaped elements;

each of said sector shaped elements having a radial cross bar contact face and an arcuate shoulder extending therefrom in radially inwardly spaced relation to said cross bars; and a pair of annular plates adapted to hold said sector shaped elements together.

References Cited in the file of this patent

UNITED STATES PATENTS

| 738,450 | Howard | Sept. 8, 1903 |
| 1,391,719 | Conyngham | Sept. 27, 1921 |
| 2,419,522 | Acton | Apr. 29, 1947 |
| 2,528,890 | Lawrence | Nov. 7, 1950 |
| 2,584,512 | Strait | Feb. 5, 1952 |
| 2,914,126 | Skullerud | Nov. 24, 1959 |
| 2,970,662 | Hetteen | Feb. 7, 1961 |
| 2,992,863 | Fredricks et al. | July 18, 1961 |
| 3,077,238 | Nelson | Feb. 12, 1963 |

FOREIGN PATENTS

| 39,543 | Norway | Aug. 18, 1924 |
| 462,279 | Italy | Mar. 7, 1951 |
| 607,710 | Canada | Nov. 1, 1960 |
| 610,777 | Canada | Dec. 20, 1960 |